United States Patent
Matsuura et al.

(10) Patent No.: US 9,082,432 B1
(45) Date of Patent: Jul. 14, 2015

(54) THIN FILM MAGNETIC HEAD, HEAD GIMBAL ASSEMBLY, AND MAGNETIC RECORDING DEVICE

(71) Applicant: TDK Corporation, Tokyo (JP)

(72) Inventors: Yuji Matsuura, Tokyo (JP); Atsushi Yamaguchi, Tokyo (JP); Michitaka Nishiyama, Tokyo (JP); Yumiko Yokoyama, Tokyo (JP); Yuki Nishimura, Tokyo (JP); Ittetsu Kitajima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 14/467,231

(22) Filed: Aug. 25, 2014

(51) Int. Cl.
  *G11B 5/31* (2006.01)
  *G11B 5/127* (2006.01)
(52) U.S. Cl.
  CPC ............ *G11B 5/3116* (2013.01); *G11B 5/1278* (2013.01)
(58) Field of Classification Search
  USPC .............................................. 360/125.3, 319
  See application file for complete search history.

(56) References Cited

U.S. PATENT DOCUMENTS

| 8,238,056 B2 | 8/2012 | Guan et al. | |
| 8,477,452 B2 * | 7/2013 | Sasaki et al. | 360/125.13 |
| 2006/0256481 A1 * | 11/2006 | Kagami et al. | 360/317 |
| 2011/0041322 A1 | 2/2011 | Sasaki et al. | |
| 2012/0044598 A1 * | 2/2012 | Bai et al. | 360/123.12 |
| 2012/0147499 A1 | 6/2012 | Sasaki et al. | |
| 2012/0147501 A1 | 6/2012 | Sasaki et al. | |
| 2012/0188666 A1 | 7/2012 | Sasaki et al. | |
| 2012/0210566 A1 | 8/2012 | Sasaki et al. | |
| 2012/0218662 A1 * | 8/2012 | Sasaki et al. | 360/123.12 |
| 2013/0283601 A1 | 10/2013 | Sasaki et al. | |

* cited by examiner

*Primary Examiner* — Wayne Young
*Assistant Examiner* — Carlos E Garcia
(74) *Attorney, Agent, or Firm* — Posz Law Group, PLC (57) ABSTRACT

A thin film magnetic head has a main magnetic pole layer; a first trailing shield that is positioned at the trailing side of the main magnetic pole layer, and that is close to the main magnetic pole layer; and a second trailing shield that is positioned at the trailing side of the first trailing shield, and that continues to the first trailing shield. An end surface of the second trailing shield positioned at the back side in the height direction has a first end side positioned at a medium opposing surface side, and a second end side positioned at the further back side in the height direction than the first end side, and at the trailing side closer than the first end side. An angle formed by a plane including the first end side and the second end side and a plane parallel to both the height direction and the track width direction is 30 degrees to 60 degrees.

10 Claims, 10 Drawing Sheets

THIN FILM MAGNETIC HEAD, HEAD GIMBAL ASSEMBLY, AND MAGNETIC RECORDING DEVICE

FIELD OF THE INVENTION

The present invention relates to a thin film magnetic head, a head gimbal assembly and a magnetic recording device.

BACKGROUND OF THE INVENTION

Recently, in a magnetic recording/reproducing device, such as a magnetic recording device, improvement of a thin film magnetic head and a magnetic recording medium is in demand in association with high recording density.

Thin film magnetic heads can be classified roughly into a so-called longitudinal magnetic recording system and a perpendicular magnetic recording system depending on the recording system. The longitudinal magnetic recording system is a system for forming the direction of recording magnetization in the longitudinal direction within the recording surface of a magnetic recording medium and recording data, and the perpendicular magnetic recording system is a system for forming the direction of recording magnetization in the perpendicular direction relative to the recording surface of the magnetic recording medium and recording data.

A thin film magnetic head of the perpendicular magnetic recording system can record data with a recording density which is dramatically higher than that of the longitudinal magnetic recording system. In addition, after data is recorded, the magnetic recording medium is hardly affected by thermal fluctuation. Consequently, the reliability of the data recorded with high recording density using the perpendicular magnetic recording system thin film magnetic head is extremely high.

The perpendicular magnetic recording system thin magnetic head, which is extremely advantageous for high recording density, constitutes the major portion of such systems in the technical field of magnetic recording, and further higher recording density is in demand for the thin film magnetic head. In order to satisfy such demand, it is necessary to improve the writing characteristics of the thin film magnetic head, and to prevent adjacent track erasure (ATE) or wide area track erasure (WATE) when data is recorded to the magnetic recording medium using a perpendicular magnetic recording system thin film magnetic head.

Figure 8:
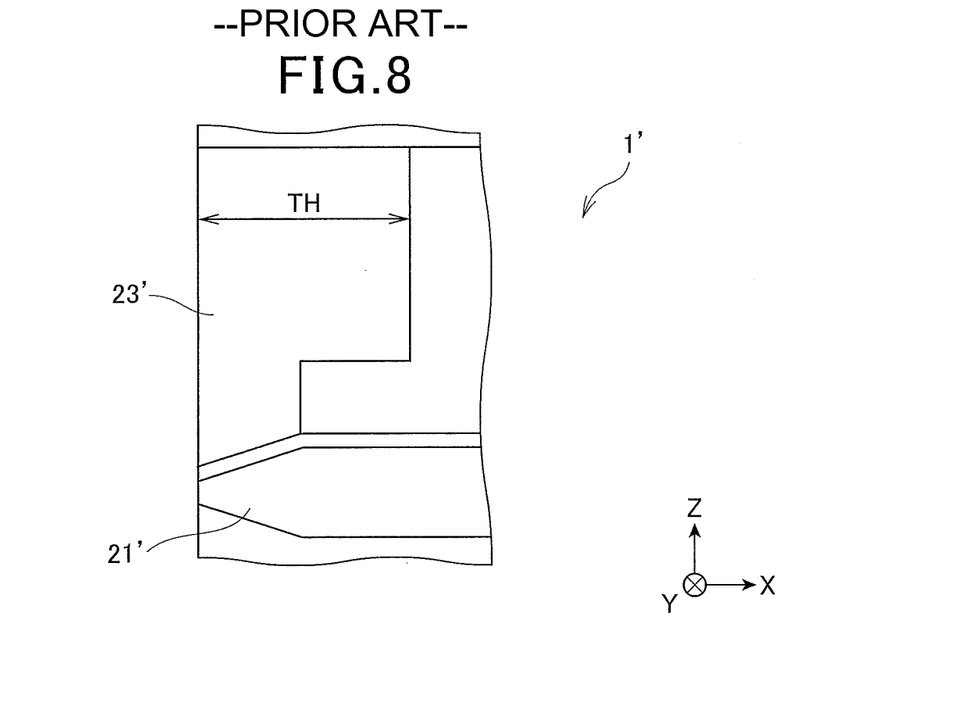
FIG. 8 is a cross-sectional view (XZ cross-sectional view) schematically showing a configuration that is equivalent to the main part shown in FIG. 7 in a conventional thin film magnetic head, along a direction that intersects the ABS.

For the purpose of improving the writing characteristics and preventing adjacent track erasure or wide area track erasure (ATE or WATE), for example, in U.S. Pat. No. 8,238,056, as shown in FIG. 8, a thin film magnetic head 1' is disclosed that includes a main magnetic pole layer 21' having a tilted surface where its thickness (thickness in a medium traveling direction) can be gradually reduced toward a medium opposing surface and a trailing shield 23' positioned at the trailing side of the main magnetic pole 21'.

In the thin film magnetic head 1', if it is miniaturized in order to respond to the demand for further higher recording density, and the thickness TH of the trailing shield 23' in the height direction becomes smaller, saturation of magnetic flux in the trailing shield 23' occurs, and adjacent track erasure or wide area track erasure (ATE or WATE) may not be effectively suppressed.

SUMMARY OF THE INVENTION

The objective of the present invention is to provide a thin film magnetic head that can suppress the saturation of magnetic flux in the trailing shield positioned at the trailing side of the main pole layer, and that can effectively suppress adjacent track erasure or wide area track erasure (ATE or WATE), and to provide a head gimbal assembly and a magnetic recording device using the thin film magnetic head.

In order to accomplish the objective above, the present invention provides a thin film magnetic head that includes: a main magnetic pole layer, and a trailing shield positioned closer to a trailing side than the main magnetic pole layer, wherein the trailing shield has a first trailing shield that is close to the main magnetic pole layer, and a second trailing shield that is positioned closer to the trailing side than the first trailing shield and that continues to the first trailing shield; the second trailing shield has a first end surface that is connected to the trailing-side end surface of the first trailing shield, and a second end surface that continues to the end side positioned at the back side in the height direction out of the end sides configuring the first end surface; the second end surface has a first end side positioned closest to a medium opposing surface, and a second end side positioned at the farthest back side in the height direction, and closer to the trailing side than the first end side; and the angle formed by a virtual plane including the first end side and the second end side relative to a plane parallel to both the height direction and the track width direction is 30 degrees to 60 degrees (Invention 1).

According to the above invention (Invention 1), a second trailing shield configuring a trailing shield positioned at the trailing side of a main magnetic pole layer has a first end surface making contact with the trailing side end surface of the first trailing shield, and the second end surface continuing to the end side positioned at the back side of the first end surface in the height direction; and because the angle of the plane including a first end side positioned the closest to the medium opposing surface side and a second end side positioned at the farthest back side in the height direction, and positioned closer to the trailing side than the first end side out of the end sides constituting the second end surface relative to the plane parallel to the height direction and the track width direction is 30 degrees to 60 degrees, the saturation of the magnetic flux in the trailing shield can be suppressed. As a result, the adjacent track erasure or wide area track erasure (ATE or WATE) can be effectively suppressed.

In the above invention (Invention 1), the first trailing shield has a first end surface configuring a portion of the medium opposing surface and a second end surface facing the first end surface and positioned at the back side in the height direction, and the length between the first end surface and the second end surface, which is perpendicular to the medium opposing surface, and is preferably 300 nm or less (Invention 2).

In the above invention (Invention 1), the first trailing shield has a tilted end surface that faces the main magnetic pole layer, and that tilts so as to be closer to the trailing side as oriented toward the back side in the height direction from the medium opposing surface, and the maximum dimension between the trailing side end surface and tilted end surface is preferably 300 nm (Invention 3).

In the above invention (Invention 1), it is preferable that the height-direction dimension of the first end surface of the second trailing shield be the same as that of the trailing side end surface of the first trailing shield, or greater than that of the trailing side end surface of the first trailing shield within a range of 100 nm or less (Invention 4).

Further, the present invention provides a head gimbal assembly (HGA) that is characterized by including a slider that includes the thin film magnetic head relating to the present invention (Invention 1) and is arranged so as to face a magnetic recording medium, and a suspension that elastically supports the slider (Invention 5).

In addition, the present invention provides a magnetic recording device that is characterized by including a slider that includes the thin film magnetic head relating to the invention above (Invention 1) and that is arranged so as to face a magnetic recording medium, and a positioning device that supports the slider and that positions the slider relative to the magnetic recording medium (Invention 6).

According to the present invention, a thin film magnetic head can be provided that can suppress saturation of magnetic flux in a trailing shield positioned at the trailing side of the main magnetic pole layer, and that can effectively suppress adjacent track erasure or wide area track erasure (ATE or WATE), and the head gimbal assembly and the magnetic recording device using the thin film magnetic head.

DETAILED DESCRIPTION OF THE INVENTION

The best mode for implementing the present invention is described in detail hereafter.

Before explaining the embodiment of the present invention, terminology used herein will be defined. In a lamination structure or an element structure formed on an element formation surface of a slider substrate of a thin film magnetic head, the substrate side viewed from a layer or an element to be a reference is regarded as "downward", and its opposite side is regarded as "upward". Further, the lamination direction according to the lamination order of film formation is regarded as an upper direction. Further, in the embodiment of the thin film magnetic head, "X, Y and Z directions" are defined in some drawings as needed. Herein, the Z-axis direction corresponds to the vertical direction above, and +Z side is equivalent to the trailing side, and −Z side is equivalent to the leading side. The Y-axis direction is regarded as the track width direction, and the X-axis direction is regarded as the height direction, a depth direction or rearward. Further, in the drawings, in order to make constructional elements viewable, a diminishing scale of the lateral and vertical constructional elements may be illustrated by exaggeration, and the diminishing scale may be different from an actual one.

Before providing a detailed description of the thin film magnetic head relating to the present embodiment, a magnetic recording device and a head gimbal assembly (HGA) having the thin film magnetic head are described with reference to FIGS. 1 and 2.

[Magnetic Recording Device and Head Gimbal Assembly (HGA)]

Figure 1:
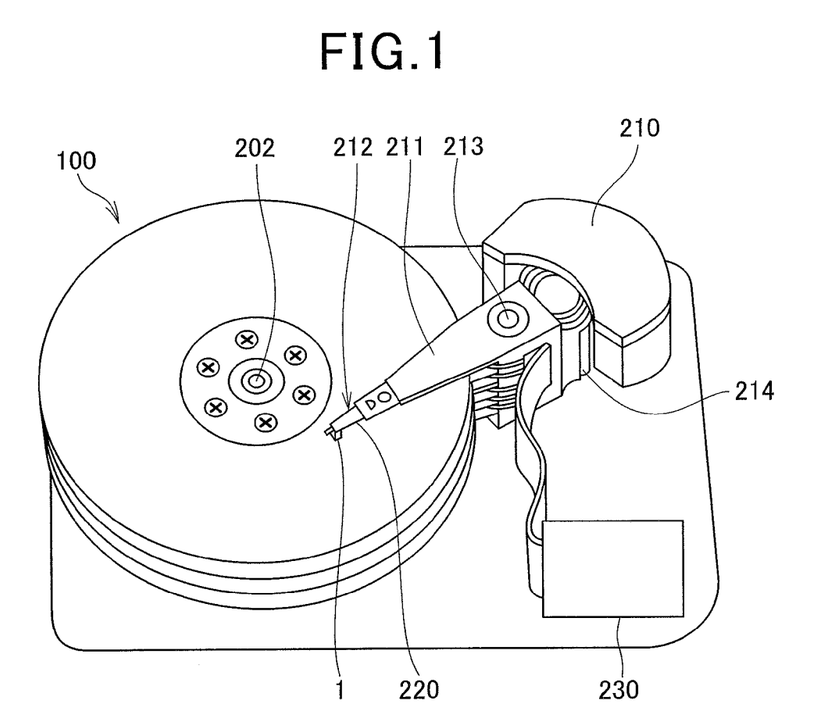
FIG. 1 is a perspective view schematically showing a magnetic recording device in one embodiment of the present invention.
Figure 2:
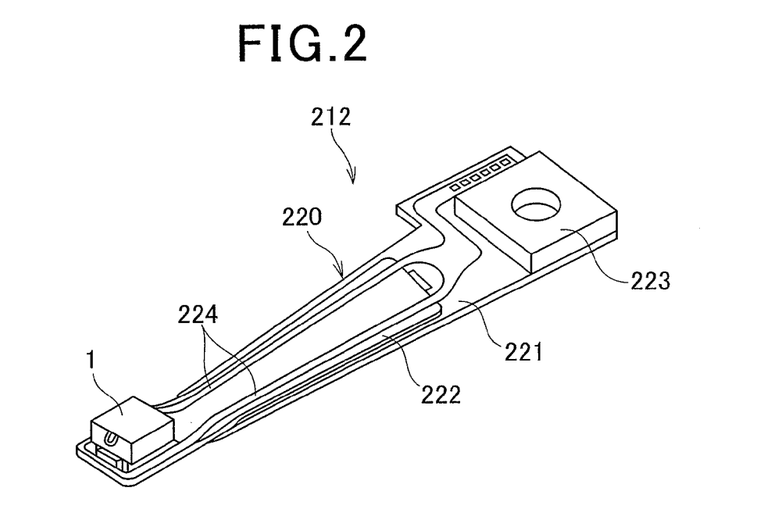
FIG. 2 is a perspective view schematically showing a head gimbal assembly (HGA) in one embodiment of the present invention.

FIG. 1 is a perspective view schematically showing a magnetic recording device where the thin film magnetic head relating to the present embodiment is mounted, and FIG. 2 is a perspective view schematically showing a head gimbal assembly (HGA) including the thin film magnetic head relating to the present embodiment.

As shown in FIG. 1, the magnetic recording device in the present embodiment includes a plurality of magnetic disks 100 that rotate around a rotational axis of a spindle motor 202; an assembly carriage device 210 where a plurality of drive arms 211 are provided; a head gimbal assembly (HGA) 212 that is attached to a front end portion of each drive arm 211 and has a thin film magnetic head 1; and a control circuit 230 that controls writing and reading operations of the thin film magnetic head 1 relating to the present embodiment.

In the present embodiment, the magnetic disk 100 as a magnetic recording medium is for perpendicular magnetic recording, and for example, has a structure where a soft magnetic under layer, an intermediate layer, a magnetic recording layer (perpendicular magnetization layer) are sequentially laminated.

The assembly carriage device 210 is a device for positioning the thin film magnetic head 1 on a track where recording bits of the magnetic disk 100 are arranged side-by-side. In the assembly carriage device 210, the drive arms 211 are stacked in a direction along a pivot bearing shaft 213, and are configured to be angularly swingable to set the pivot bearing shaft 213 as the center by a voice coil motor (VCM) 214.

Furthermore, the structure of the magnetic recording device in the present embodiment is not limited to the structure above, but the magnetic disk 100, the drive arm 211, the HGA 212 and the thin film magnetic head 1 may be singular, respectively.

In the HGA 212 shown in FIG. 2, a suspension 220 has a load beam 221, a flexure 222 that is affixed to the load beam 221 and has flexibility, and a base plate 223 that is provided at a base portion of the load beam 221. Further, a wiring member 224 including a lead conductor and connection pads that are electrically connected to both ends of the lead conductor is provided. The thin film magnetic head 1 relating to the present embodiment is affixed to the flexure 222 at the front end portion of the suspension 220 so as to face the surface of each magnetic disk 100 with predetermined space (flying height).

In addition, one end of the wiring member 224 is electrically connected to a terminal electrode of the thin film magnetic head 1 relating to the present embodiment. Furthermore, the structure of the suspension 220 in the present embodiment is also not limited to the structure above.

[Description of Configuration Example of Thin Film Magnetic Head]

Figure 3:
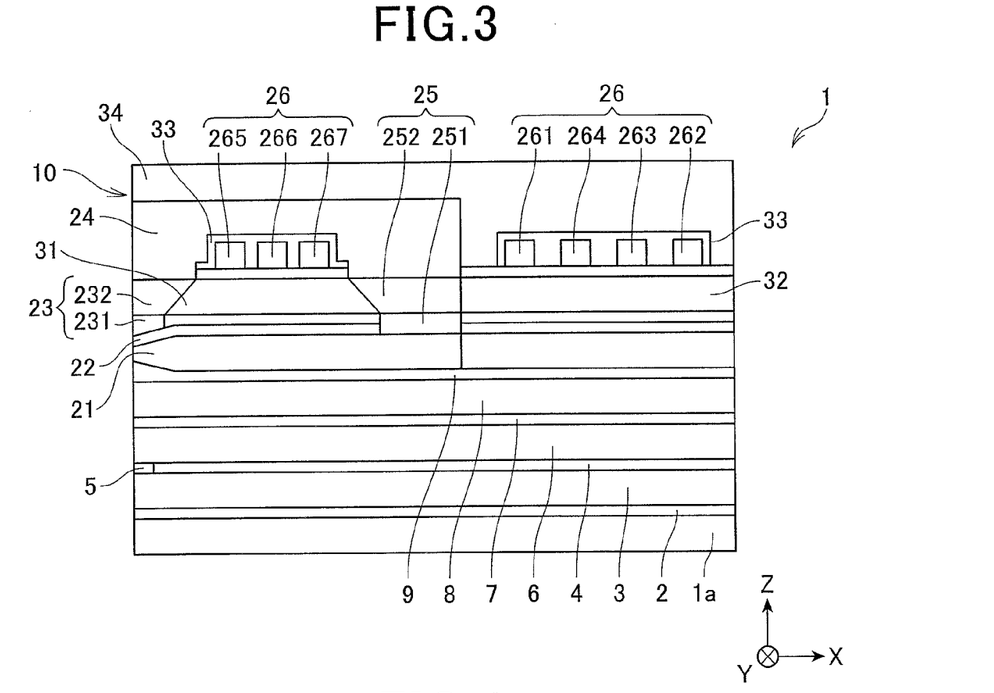
FIG. 3 is a cross-sectional view (XZ cross-sectional view) of a thin film magnetic head relating to one embodiment of the present invention along a direction that intersects the ABS, which is a medium opposing surface.

Next, the thin film magnetic head relating to the present embodiment is described with reference to the drawings. FIG. 3 is a cross-sectional view (XZ cross-sectional view) of the thin film magnetic head relating to the present embodiment along a direction to intersect the ABS, which is a medium opposing surface.

As shown in FIG. 3, the thin film magnetic head 1 relating to the present embodiment has a substrate 1*a*, a reproduction head laminated onto the substrate 1*a* and a recording head. Further, the thin film magnetic head 1 has an ABS 10, which is a medium opposing surface facing the magnetic disk.

The reproduction head has an MR element 5 that is arranged in the vicinity of the ABS 10, and that is for detecting a signal magnetic field from the magnetic disk. Further, the reproduction head has an insulation layer 2 formed on the substrate 1*a*, a lower side shield layer 3 made from a magnetic material and a shield gap layer 4 that shields a side part and a rear part of the MR element 5.

In addition, the reproduction head has an upper side shield layer 6 that is formed on the shield gap layer 4 and is made from a magnetic material, an insulation layer 7 formed on the upper shield layer 6 and an intermediate shield layer 8 that is formed on the insulation layer 7 and is made from a magnetic material.

The lower side shield layer 3 and the upper side shield layer 6 are provided mainly for the purpose of preventing the MR element 5 from receiving an external magnetic field as noise. The intermediate shield layer 8 has a function to mainly shield the MR element 5 from a magnetic shield that is generated at the recording head. Furthermore, in the present embodiment, the intermediate shield layer 8 may not be provided.

The lower side shield layer 3, the upper side shield layer 6 and the intermediate shield layer 8 are magnetic layers that are formed using, for example, a frame plating method or a sputtering method, and are made from a magnetic material. The lower side shield layer 3, the upper side shield layer 6 and the intermediate shield layer 8 are configured with NiFe (permalloy), FeSiAl (sendust), CoFeNi, CoFe, FeN, FeZrN or CoZrTaCr, or a soft magnetic material of a multilayer film of these materials. Thickness of those is, for example, approximately 0.5 µm to 3 µm.

The MR element 5 is a magnetically sensitive part that senses a signal magnetic field utilizing an MR effect, and for example, it may be any of Current In Plane-Giant Magneto-Resistive (CIP-GMR) multilayer body utilizing a current-in-plane giant magneto-resistive effect, a Current Perpendicular to Plane-Giant Magneto-Resistive (CPP-GMR) multilayer body utilizing a current-perpendicular to plane-giant-magneto-resistive effect or a Tunneling Magneto-Resistive (TMR) multilayer body utilizing a tunnel-magneto-resistive effect.

The MR element 5 utilizing these MR effects can sense a signal magnetic field from a magnetic disk with high sensitivity. Furthermore, if the MR element 5 is a CPP-GMR multilayer body or a TMR multilayer body, the lower side shield layer 3 and the upper side shield layer 6 can fulfill a role as an electrode, as well. In the meantime, if the MR element 5 is a CIP-GMR multilayer body, an insulation layer is provided between the MR element 5 and the lower side shield layer 3 and between the MR element 5 and the upper shield layer 6, respectively. In addition, an MR lead layer that is electrically connected to the MR element 5 is provided.

In the present embodiment, an insulation layer 9 is provided on the intermediate shield layer 8, and a recording head is formed on this insulation layer 9.

The recording head is for perpendicular magnetic recording, and has a main magnetic pole 21, a recording gap layer 22, a trailing shield 23, a write shield 24, an auxiliary yoke layer 25 and an excitation coil 26 for magnetic recording.

The main magnetic pole layer 21 is provided on the insulation layer 9 configured with, for example, an insulation material, such as $Al_2O_3$ (alumina). The main magnetic pole layer 21 configures a magnetic guide path for focusing and guiding magnetic flux that is generated by applying a writing current to the excitation coil 26 for magnetic recording to a magnetic recording layer (perpendicular magnetization layer) of the magnetic disk to be written.

Figure 4:
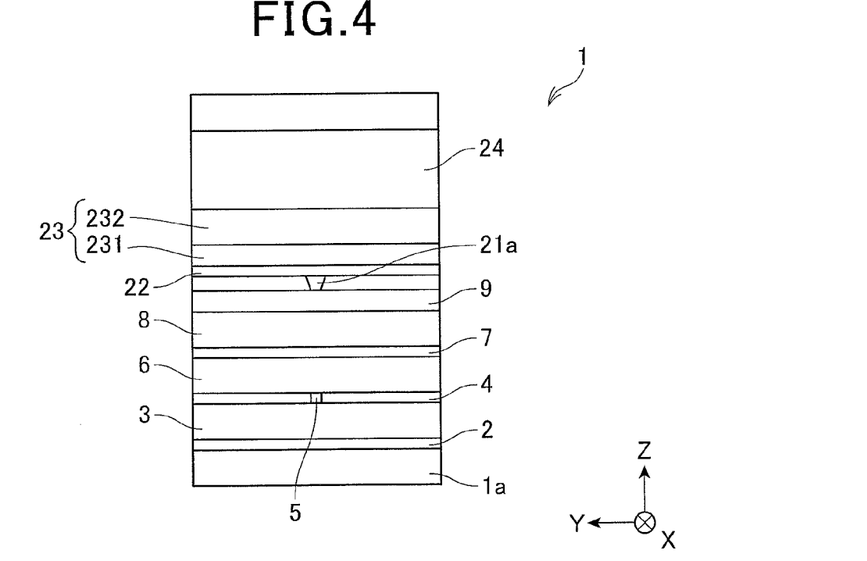
FIG. 4 is a plan view (YZ plan view) of the thin film magnetic head relating to one embodiment of the present invention viewed from a medium opposing surface side.

The main magnetic layer 21 has, for example, a so-called inverted trapezoidal-shaped end surface 21*a* where an upper side (+Z side) is wider than a lower side (−Z side) and its width becomes narrower in the downward direction (−Z direction) in the ABS 10 (see FIG. 4).

Figure 5:
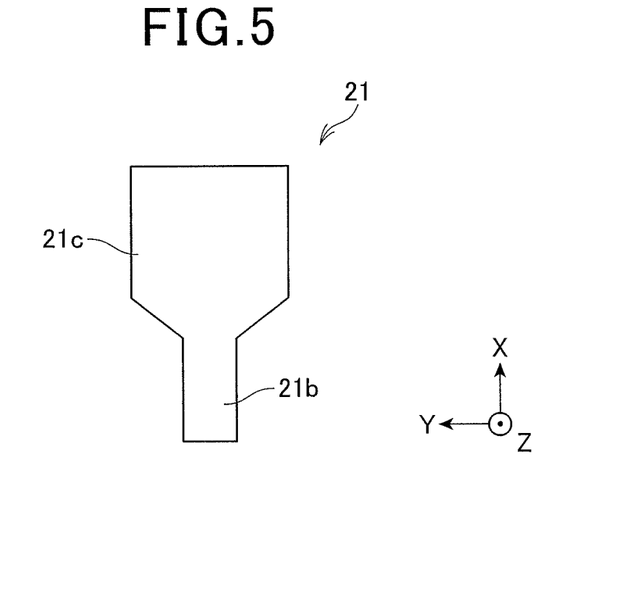
FIG. 5 is a plan view (XY plan view) schematically showing a main magnetic pole layer of the thin film magnetic head relating to one embodiment of the present invention.

The main magnetic pole layer 21 preferably has a main magnetic pole part 21*b* having a small width in the track width direction, and a main magnetic pole body part 21*c* with a wide width positioned in the rear direction (+X direction) continuing to the main magnetic pole part 21*b*, in the vicinity of the ABS 10 (see FIG. 5). Because the main magnetic pole part 21*b* has a small width, it becomes possible to set the track width to a minute value corresponding to the high recording density.

The main magnetic pole part 21*b* and the main magnetic body part 21*c* are configured with a soft magnetic material having high saturation magnetic flux density, and, for example, can be configured with a soft magnetic material, which is a ferrous alloy material consisting primarily of Fe, such as FeNi, FeCo, FeCoNi, FeN or FeZrN. The main magnetic pole part 21*b* and the main magnetic body part 21*c* may be formed differently and can be configured with different soft magnetic materials from each other. For example, the main magnetic pole part 21*b* may be configured with a soft magnetic material having higher saturation magnetic flux density than the main magnetic pole body part 21*c*.

The upper side (+Z side) end surface and the lower side (−Z side) end surface of the main magnetic pole layer 21 positioned in the vicinity of the ABS 10 are configured to be tapered so as to gradually decrease the thickness (Z-direction thickness) of the main magnetic pole layer 21 toward the ABS 10. This enables magnetic flux for recording that is generated from the main magnetic pole layer 21 to be focused at the ABS 10.

The recording gap layer 22 has a function to magnetically separate the main magnetic pole layer 21 from the trailing shield layer 23 connected to the write shield 24 in the vicinity of the head end surface (ABS 10).

The recording gap layer 22 is configured with, for example, a nonmagnetic insulation material, such as alumina ($Al_2O_3$), silicon $SiO_2$ (dioxide), AlN (aluminum nitride) or DLC (diamond-like carbon); or a nonmagnetic conductive material, such as Ru (ruthenium). The thickness of the recording gap layer 22 defines a gap between the main magnetic pole layer 21 and the trailing shield 23, and for example, is set at approximately 0.01 µm to 0.5 µm.

The trailing shield 23 has a function to take in a magnetic flux for recording that is generated from the main magnetic pole layer 21 and that is spread. In the present embodiment, the trailing shield 23 has a first trailing shield 231 that is close to the main magnetic pole layer 21 across the recording gap layer 22 and a second trailing shield 232 that is positioned closer to the trailing side than the first trailing shield 231, and that directly continues to the first trailing shield 231.

Figure 6:
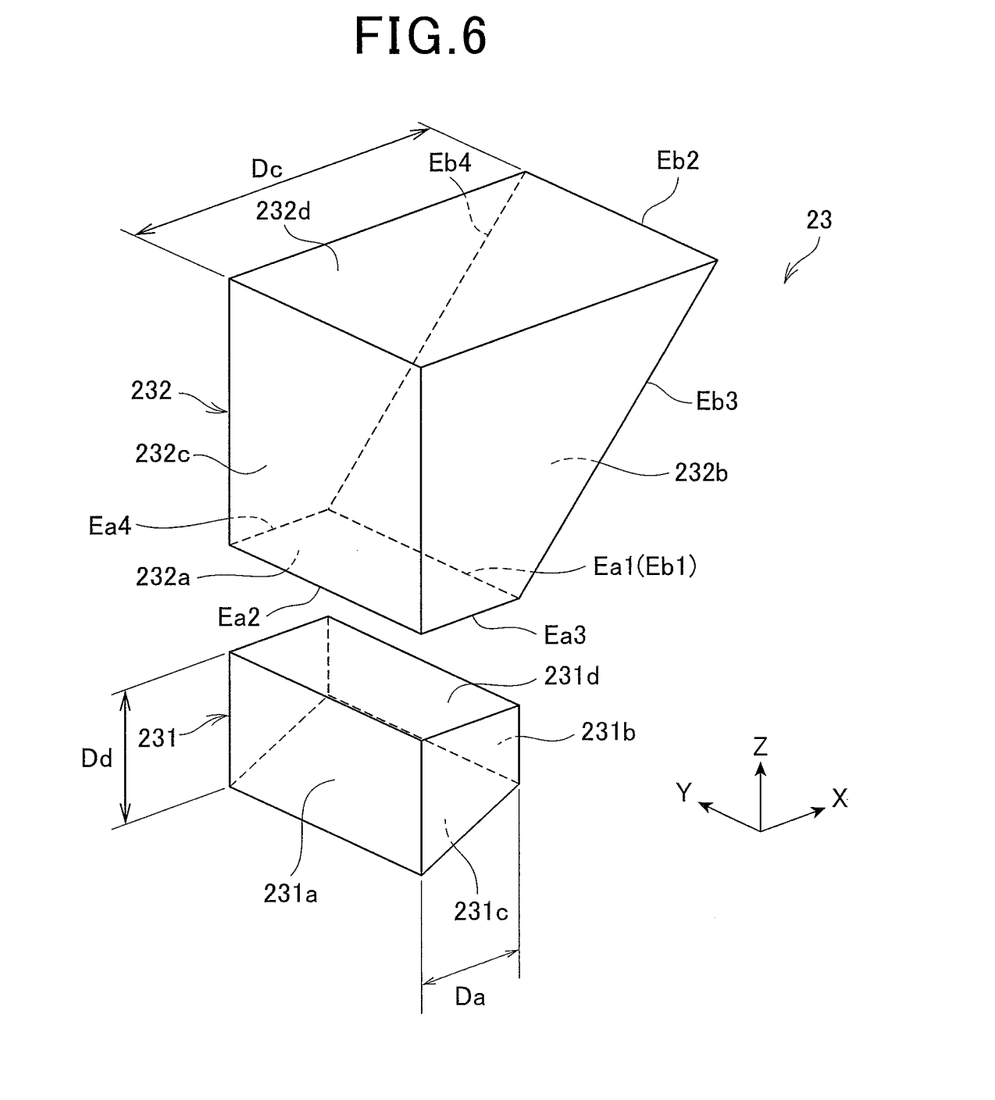
FIG. 6 is an exploded perspective view schematically showing a trailing shield of the thin film magnetic head relating to one embodiment of the present invention.

FIG. 6 is a perspective view showing the trailing shield 23 in an exploded view in order to facilitate the understanding of the configuration of the trailing shield 23 in the present embodiment. As shown in FIG. 6, the first trailing shield 231 has a first end surface 231a configuring a portion of the ABS 10; a second end surface 231b that is positioned at farther back side in the height direction than the first end surface 231a and faces the first end surface 231a; a third end surface (tilted end surface) 231c contacting the recording gap layer 22; and a fourth end surface (trailing side end surface) 231d positioned at the trailing side.

The third end surface 231c is configured as a tilted end surface tilting along an upper side end surface of the magnetic pole layer 21 formed to be tapered and the recording gap layer 22.

Length Da (length in the perpendicular direction relative to the ABS 10) between the first end surface 231a and the second end surface 231b of the first trailing shield 231 is preferably 300 nm or less, and more preferably 100 nm to 200 nm. If the length Da exceeds 300 nm, leakage amount of the magnetic flux from the main magnetic pole layer 21 to the first trailing shield 231 may become greater, and writing performance may be reduced.

Maximum dimension Dd (Z-direction length at the ABS 10) between the fourth end surface 231d positioned at the training side of the first trailing shield 231 and the third end surface 231c is preferably 300 nm or less, and more preferably 100 nm or less. If the maximum dimension Dd exceeds 300 nm, volume of the first trailing shield 231 with smaller dimension in the height direction out of the trailing shield 23 is increased, and the trailing shield 23 is saturated due to magnetic flux returned from the soft magnetic under layer positioned at the lower side of the magnetic recording layer (perpendicular magnetization layer) of the magnetic disk 100 (see FIG. 1), and it may become difficult to suppress adjacent track erasure or wide area track erasure (ATE or WATE).

The second trailing shield 232 has a first end surface 232a that is directly connected to the fourth end surface 231d of the first trailing shield 231; a second end surface 232b positioned at farther back side in the height direction (+X direction) than the first end surface 232a; a third end surface 232c configuring a portion of the ABS 10; and a fourth end surface 232d positioned at the trailing side.

The second end surface 232b of the second trailing shield 232 continues to the first end surface 232a to be in common with a first end side Eb1 positioned closest to ABS 10 side out of end sides Eb1 to Eb4 that configure the second end surface 232b and an end side Ea1 positioned at the back side in the height direction (+X direction) out of end sides Ea1 to Ea4 that configure the first end surface 232a.

Figure 7:
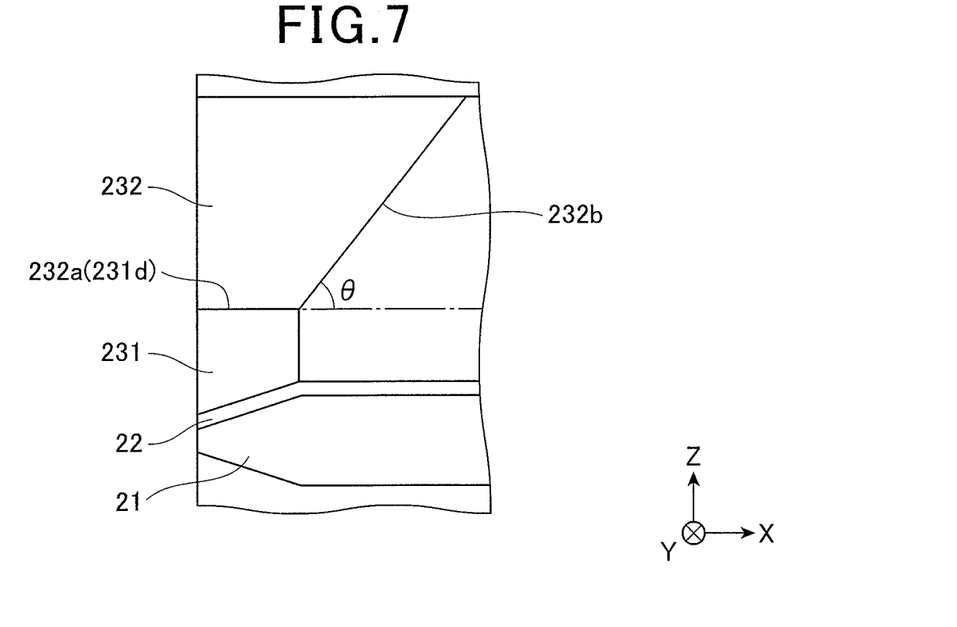
FIG. 7 is a cross-sectional view (XZ cross-sectional view) schematically showing a configuration of a main part of the thin film magnetic head relating to one embodiment of the present invention along the direction that intersects ABS.

As shown in FIG. 7, the second end surface 232b of the second trailing shield 232 is configured as a tilted end surface having a predetermined angle θ relative to the plane (XY plane), which is parallel to both the height direction and the track width direction. As described above, in order to respond to the request for high recording density, it is required to minimize the dimension of the first trailing shield 231 in the height direction as much as possible (for example, 300 nm or less). Consequently, because the second end surface 232b of the second trailing shield 232 is configured as the tilted end surface having the predetermined angle θ, volume of the trailing shield 23 can be maintained as a whole, and the saturation of the magnetic flux at the trailing shield 23 can be suppressed.

Furthermore, if the volume of the trailing shield 23 as a whole is set only for the purpose of maintaining the saturation by the magnetic flux to a degree to be suppressible, in a conventional thin film magnetic head 1' shown in FIG. 8, increasing the thickness TH of a trailing shield 23' in the height direction can also be considered. However, if the thickness TH of the trailing shield 23' in the height direction is increased in the structure of the thin film magnetic head 1' shown in FIG. 8, the surface of the trailing shield 23' close to a main magnetic pole layer 21' is increased, and leakage amount of the magnetic flux from the main magnetic pole layer 21' to the trailing shield 23' is increased. As a result, the saturation of the magnetic flux at the trailing shield cannot be suppressed, and it may become difficult to suppress the adjacent track erasure or wide area track erasure (ATE or WATE).

The angle θ of the second end surface 232b is 30 degrees to 60 degrees, and is preferably 40 degrees to 50 degrees. If the angle θ exceeds 60 degrees, the trailing shield 23 is saturated due to the magnetic flux, and it may become difficult to suppress the adjacent track erasure or wide area track erasure (ATE or WATE).

Figure 9A:
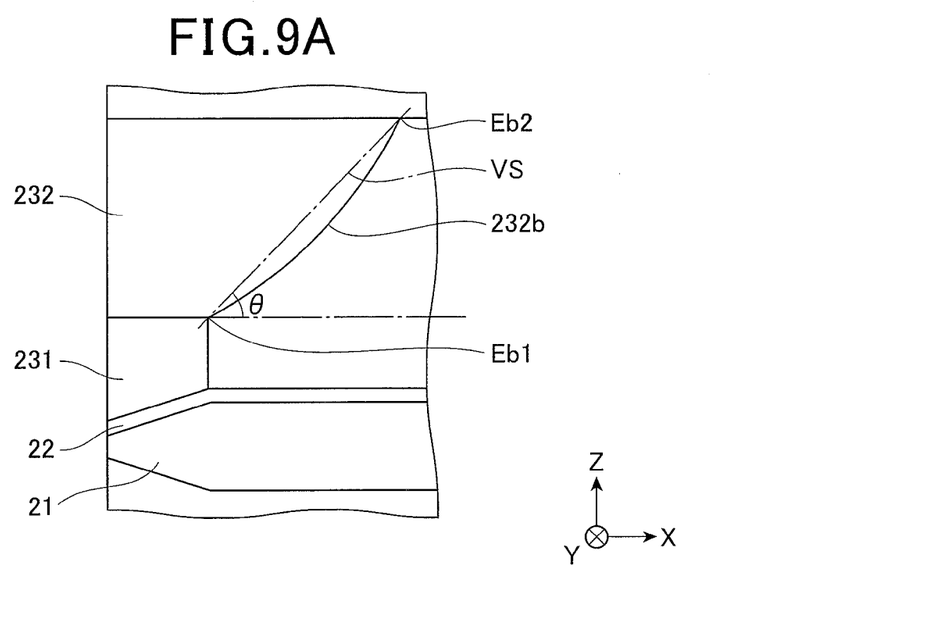
FIGS. 9A, 9B and 9C are cross sectional views (XZ cross-sectional views) schematically showing a configuration of a main part of a thin film magnetic head relating to other embodiments of the present invention, along a direction that intersects the ABS.
Figure 9B:
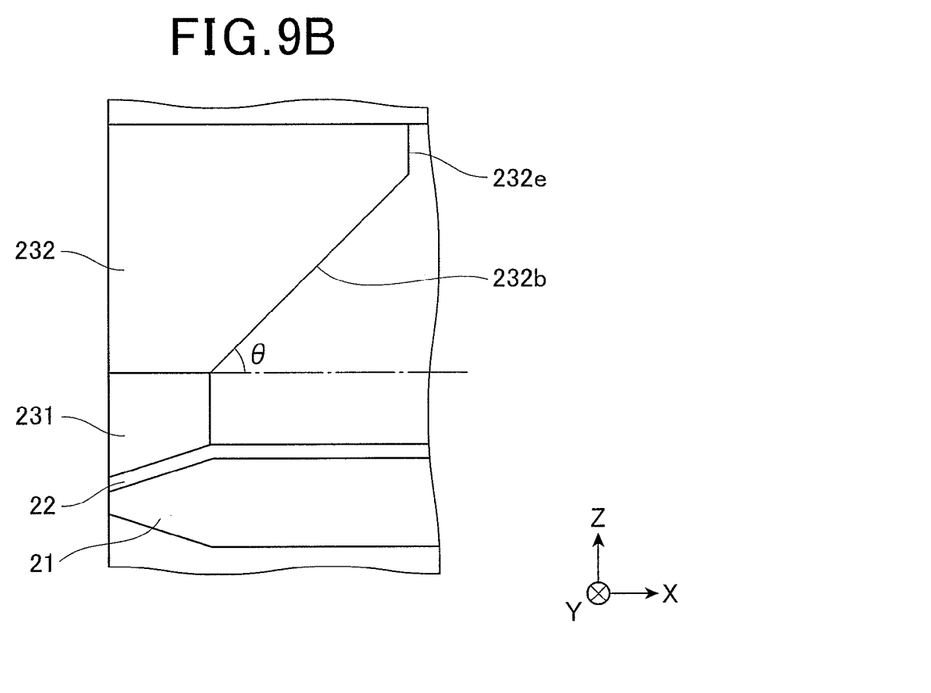
Figure 9C:
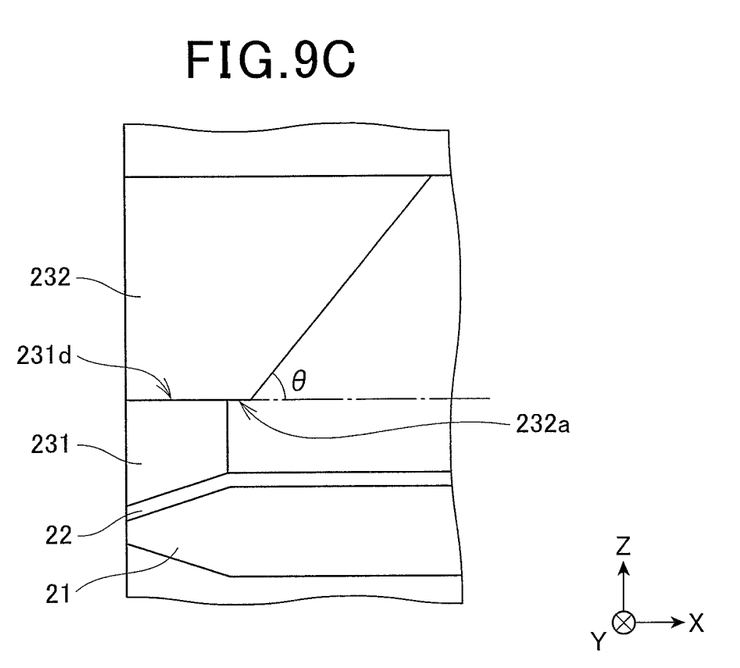

In the present embodiment, the second end surface 232b of the second trailing shield 232 is configured as a tilted end surface (flat surface) having a predetermined angle θ, but is limited to such a mode. For example, as shown in FIG. 9A, the second end surface 232b of the second trailing shield 232 may be configured as a curved tilted surface that is curved in the −Z direction. In this case, a virtual plane VS including the first end side Eb1 positioned closest to ABS 10 side and the second end side Eb2 positioned at the farthest back side in the height direction out of the end sides Eb1 to Eb4 that configure the second end surface 232b may be tilted at a predetermined angle θ relative to the plane (XY plane), which is parallel to both the height direction and the track width direction. Further, as shown in FIG. 9B, the second trailing shield 232 may have a fifth end surface 232e that is bent in the Z direction in the middle of the second end surface 232b tilted at the predetermined angle θ, and that is parallel to the Z direction. In addition, as shown in FIG. 9C, a dimension of the first end surface 232a of the second trailing shield 232 in the X direction (height direction) may be greater than that of the fourth end surface 231d of the first trailing shield 231 in the X direction (height direction).

In the present embodiment, the dimension of the second end surface 232b of the second trailing shield 232 in the X direction is the same as that of the fourth end surface 231d of the first trailing shield 231 in the X direction, but it is not limited to such mode, and this may be greater than the dimension of the fourth end surface 231d of the first trailing shield 231 in the X direction. In this case, a difference of both dimensions is preferably 100 nm or less.

The maximum dimension of the second trailing shield 232 in the X direction (dimension Dc of the fourth end surface 232d in the X direction) is preferably 200 nm to 700 nm, and is more preferably 400 nm to 600 nm. If the dimension Dc is within the range above, sufficient writing characteristics can be demonstrated.

In the present embodiment, the trailing shield 23 has greater width in the track width direction than the main magnetic pole layer 21. Having the trailing shield 23 results in a more precipitous gradient of the magnetic field between the end portion of the trailing shield 23 (first trailing shield 231) and the main magnetic pole layer 21. As a result, signal output jitter becomes smaller and an error rate upon reading can be reduced.

Furthermore, the trailing shield 23 can be configured with, for example, NiFe (permalloy) having high saturation magnetic flux density or a ferroalloy material, which is similar to that for the main magnetic pole layer 21.

The write shield 24 configures a magnetic path by connecting to the trailing shield 23 (the fourth end surface 232*d* of the second trailing shield 232), and configures a magnetic shield and a magnetic return part. In other words, the write shield 24 reaches the ABS 10, and fulfills a role as a magnetic guide path of the magnetic flux returned from a soft magnetic under layer provided under the magnetic recording layer (perpendicular magnetization layer) of the magnetic disk. The thickness of the write shield 24 may be, for example, approximately 0.5 μm to 5 μm. The write shield 24, for example, can be configured with a soft magnetic material.

In the present embodiment, as shown in FIG. 3, the excitation coil 26 for magnetic recording is formed on insulation layers 31 and 32. The excitation coil 26 for magnetic recording is configured to be 3-turn loop-shaped continuing from a first rear end part 261, which is one end, to a second rear end part 262, which is the other end, and has front turn portions 265 to 267 on a roughly-upper portion of the insulation layer 31, respectively.

A nonmagnetic layer 34 is provided in a part at the farther back side in the height direction than the front turn portions 265 to 267 of the excitation coil 26 for magnetic recording via the insulation layer 33. This nonmagnetic layer 34 is continuously provided on the write shield 24, as well, and reaches the ABS 10. The nonmagnetic layer 34 fulfills a function mainly as a protective layer.

Although the excitation coil 26 for magnetic recording is preferably configured with a conductive material, such as Cu (copper), it may be configured with other conductive material(s).

Furthermore, in the present embodiment, the number of turns of the excitation coil 26 for magnetic recording is three turns, but it is not limited to this mode, and this can be appropriately set within the range of one to four turns.

The excitation coil 26 for magnetic recording has a plurality of turns, and it is desirable that an insulation layer of a dry film is embedded between the wound coil crevices. As the insulation layer of the dry film, it is preferable to be configured with a material, such as alumina that is film-formed using a so-called Chemical Vapor Deposition (CVD) method. In order to certainly fill and form the insulation layer of the dry film between the coil crevices, the coil shape is particularly important, and it is particularly desired that the coil will not be inversely tapered in the depth direction.

The write shield 24 is formed on the front turn parts 265 to 266 of this excitation coil 26 for magnetic recording via the insulation layer 33. The write shield 24 is connected to an auxiliary yoke layer 25 (second auxiliary yoke layer 252), and is connected to the trailing shield 23 (second trailing shield 232) at the ABS 10 side.

[Description of Manufacturing Method for Thin Film Magnetic Head]

A main part of a manufacturing method for the thin film magnetic head relating to the present embodiment is a series of processes to form a trailing shield after a main magnetic pole layer is formed.

In other words, the main part of the manufacturing method for the thin film magnetic head relating to the present embodiment includes a step to form a first trailing shield and a first auxiliary yoke layer directly on a main magnetic pole layer under the situation where a recording gap layer is partially intervened in the vicinity of a medium opposing surface after the main magnetic pole layer is formed; a step to form an insulation layer in a crevice of the first trailing shield and the first auxiliary yoke layer; a step to form a tapered insulation layer on the insulation layer; and a step to form a second trailing shield and a second auxiliary yoke layer on the first trailing shield and the first auxiliary yoke layer, respectively.

Figure 10A:
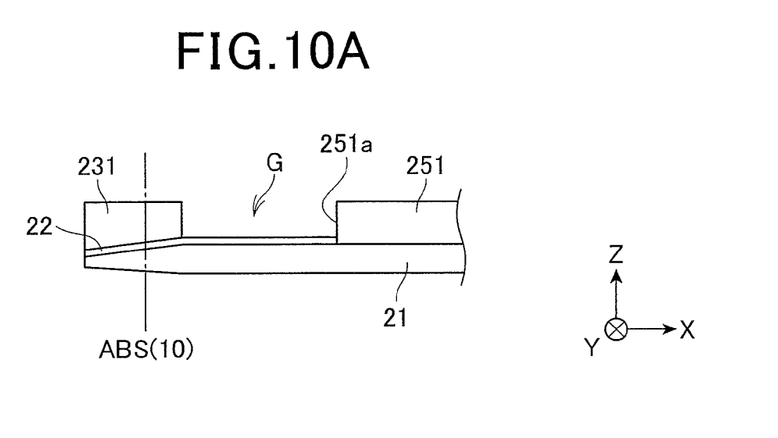
FIGS. 10A to 10F are cross-sectional views (XZ cross-sectional views) showing the working processes of a thin film magnetic head relating to one embodiment of the present invention, along a direction that intersects the ABS.

FIGS. 10A to 10F are cross-sectional views (XZ cross-sectional views) showing working processes of the thin film magnetic head relating to the present embodiment. along a direction intersecting the ABS As shown in FIG. 10A, the first trailing shield 231 and a first auxiliary yoke layer 251 are formed directly on the main magnetic pole layer 21 with predetermined crevice G under the situation where the recording gap layer 22 is partially intervened in the vicinity of the ABS as the medium opposing surface after the main magnetic pole layer 21 is formed.

Furthermore, the recording gap layer 22 on the main magnetic pole layer 21 can be formed, for example, by causing the front end of the main magnetic pole layer 21 to the front portion 251*a* of the first auxiliary yoke layer 251 to remain after a material configuring the recording gap layer 22 is laminated in roughly the entire region on the magnetic pole layer 21, and by removing the other portion by a milling process.

In FIG. 10A, the length of crevice G between the first trailing shield 231 and the first auxiliary yoke layer 251 in the height direction is, for example, approximately 2.0 μm.

The first trailing shield 231 and the first auxiliary yoke layer 251 can be formed, for example, by forming an integrated magnetic layer including these onto an integrated film including the recording gap layer 22 and the main magnetic layer 21 using a plating method, then, by forming a predetermined resist pattern using a photoresist technique, and by etching the exposed integrated magnetic layer utilizing the resist pattern as a mask. Alternatively, the first trailing shield 231 and the first auxiliary yoke layer 251 may be formed by forming a predetermined resist pattern on an integrated film including the recording gap layer 22 and the main magnetic pole layer 21 using a photoresist technique, and by filling a magnetic layer into an opening part of the resist pattern.

Figure 10B:
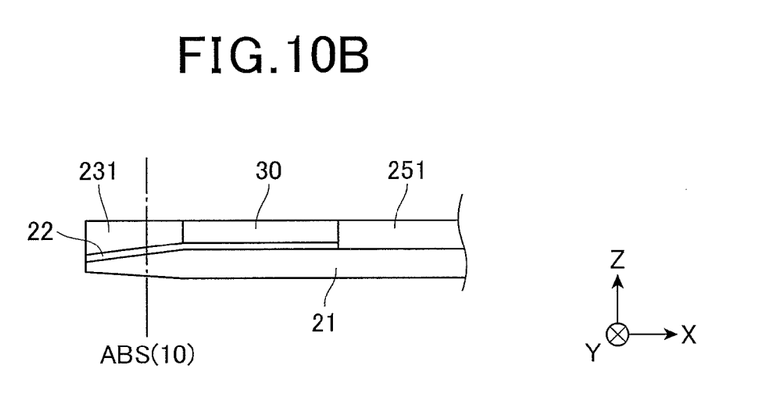
Figure 10C:
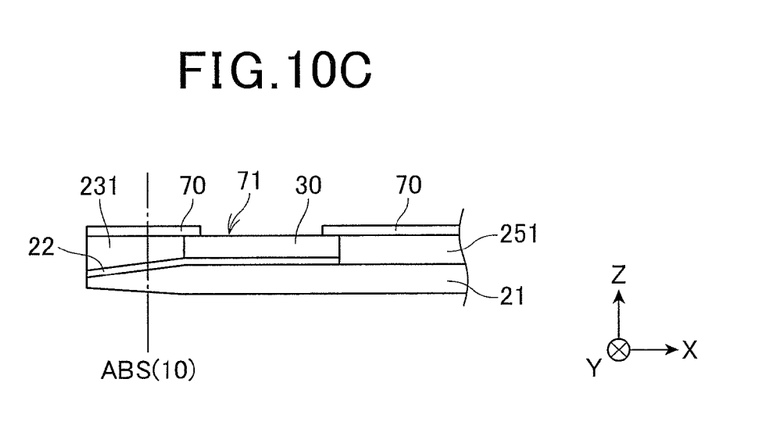
Figure 10D:
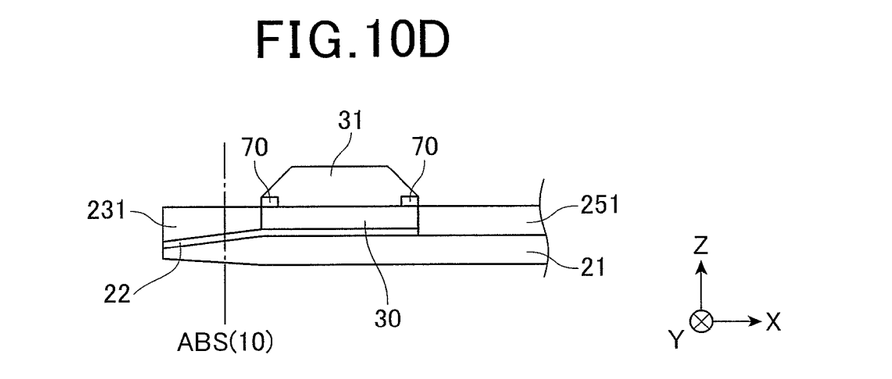
Figure 10E:
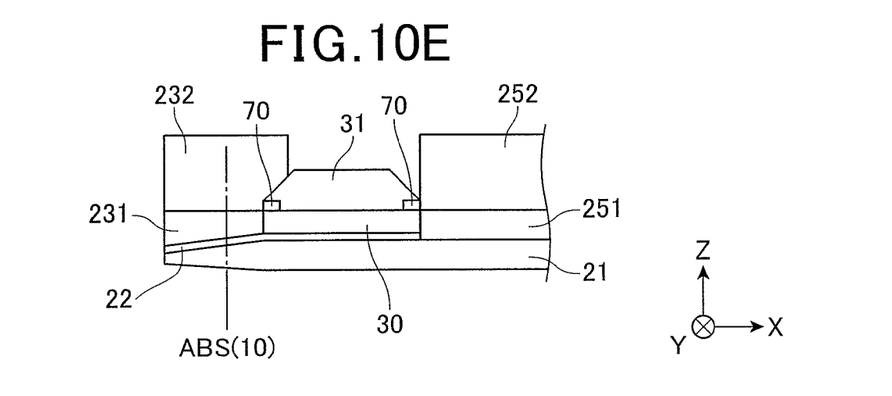
Figure 10F:
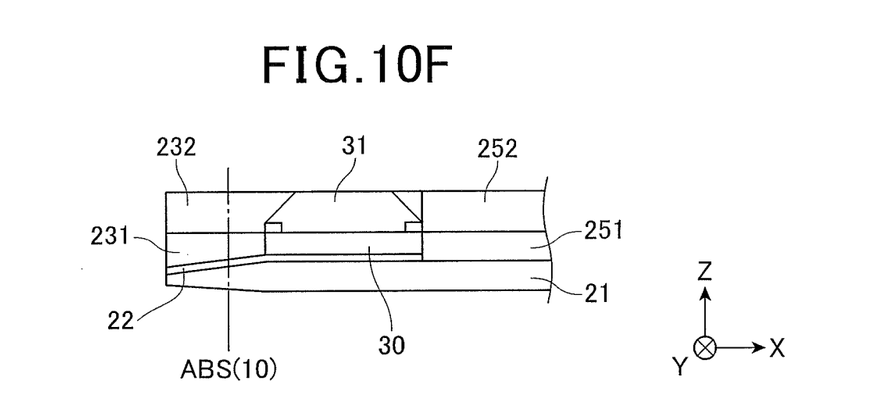

Furthermore, as shown in FIG. 10A, at the head end surface side on the left side in the drawing, it should be noted that after a desired head lamination film is formed (for example, after the excitation coil 26 for magnetic recording, the write shield 24 and a protective layer, which is the nonmagnetic layer 34, are further laminated (see FIG. 3) in the mode shown in FIG. 10F), so as to obtain predetermined height, the end surface is polished in the X direction from the left end in the drawing to the position described as the ABS 10 in the drawing, and the ABS 10 is formed at last.

Next, as shown in FIG. 10B, an insulation layer 30 made from alumina is formed in the crevice G between the first trailing shield 231 and the first auxiliary yoke layer 251, and surface planarization processing is conducted using a Chemical Mechanical Polishing (CMP) method.

Subsequently, an etching stopper film 70 is configured with Ru having an opening part 71 in a roughly X-direction center of the insulation layer 30 on the insulation layer 30 (see FIG. 10C); the insulation layer 31, such as alumina, is formed on the insulation layer 30, for example, using a film formation method, such as a CVD method; and the end surface of the insulation layer 31 at the ABS 10 side is formed to be tapered so that it is tilted at the predetermined angle θ (see FIG. 10D). Thus, the formation of the end surface of the insulation layer 31 at the ABS 10 side to be tapered enables formation of the second end surface 232*b* of the second trailing shield 232 as a tilted end surface tilted at the predetermined angle θ. Furthermore, after the end surface of the insulation layer 31 is formed to be tapered, the exposed etching stopper film 70 is removed using a dry etching method, such as RIE (see FIG. 10D).

Next, a seed film (illustration omitted) is formed on the first auxiliary yoke layer 251 using a Physical Vapor Deposition (PVD) method.

Subsequently, as shown in FIG. 10E, the second trailing shield 232 and the second auxiliary yoke layer 252 are formed by utilizing the seed film above (illustration omitted), using an electrolytic plating method.

Then, an insulation layer made from alumina is formed in the crevice between the second trailing shield 232 and the second auxiliary yoke layer 252, and surface planarization processing by the CMP method is conducted. This enables manufacturing of the main part of the thin film magnetic head 1 relating to the present embodiment (see FIG. 10F).

As described above, the thin film magnetic head 1 relating to the present embodiment includes the main magnetic pole layer 21, the first trailing shield 231 and the second trailing shield 232 positioned closer to the trailing side than the main magnetic pole layer 21, and the second end surface 232b of the second trailing shield 232 is configured as a tilted end surface tilting at a predetermined angle θ. Consequently, it becomes difficult for the magnetic flux to leak from the main magnetic pole layer 21 to the trailing shield 23, and generation of the saturation of the magnetic flux at the trailing shield 23 can be suppressed. As a result, according to the thin film magnetic head 1 relating to the present embodiment, a writing characteristic is improved, and adjacent track erasure or wide area track erasure (ATE or WATE) can be effectively suppressed.

EXAMPLE

Hereafter, the present invention will be described in further detail with examples, but the present invention is not limited to the examples below.

Example 1

The thin film magnetic head 1 having the structure shown in FIG. 9C was produced, and while magnetic write width MWW of the thin film magnetic head 1 was variously fluctuated, an overwritten value OW and a bit error rate (BER) were measured. Then, the writing characteristic was evaluated from those measurement results.

The overwriting was measured with the following procedures. First, a signal LFS having a low frequency was recorded in a track subject for measurement of the magnetic disk. Next, a signal HFS having a high frequency was overwritten in the track where the signal LFS was recorded. Then, a residual output of the first-recorded signal (signal LFS having a low frequency) was measured. Furthermore, the overwritten value OW was calculated as a ratio of the output of the residual signal LFS after overwriting to the signal LFS before overwriting.

BER was measured with the following procedures. First, a reference signal was recorded in the magnetic disk using the thin film magnetic head 1. Next, the reference signal was reproduced and the BER was calculated.

Furthermore, in the thin film magnetic head 1, a dimension of the first trailing shield 231 in the X direction (height direction) was set at 200 nm and that in the Z direction was set at 100 nm. Further, a dimension of the first end surface 232a of the second trailing shield 232 in the X direction (height direction) was set at 250 nm; that of the fourth end surface 232d in the X direction (height direction) was set at 500 nm; and that of the third end surface 232c in the Z direction was set at 300 nm. A tilted angle θ of the second end surface 232b of the second trailing shield 232 was set at 45°.

Figure 11:
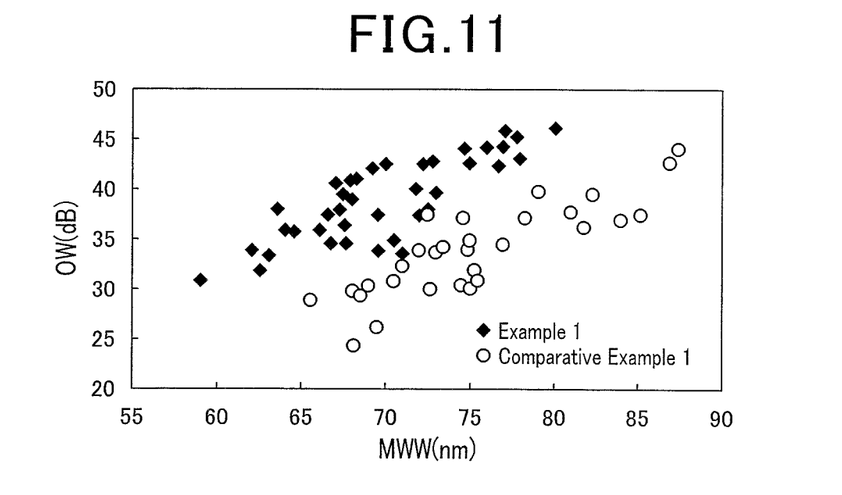
FIG. 11 is a graph showing the overwrite measurement results of Example 1 and Comparative Example 1.
Figure 12:
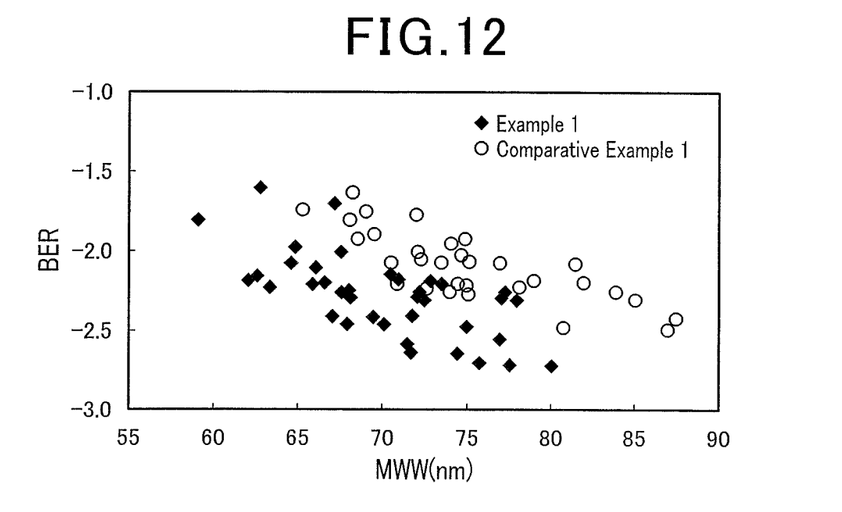
FIG. 12 is a graph showing BER measurement results of Example 1 and Comparative Example 1.

Results are shown in FIG. 11 and FIG. 12. FIG. 11 is a graph showing a relationship between the overwrite value OW (dB) and the magnetic write width MWW (nm) in the thin film magnetic heads in Example 1 and Comparative Example 1 to be described later, respectively, and FIG. 12 is a graph showing a relationship between BER and the magnetic recording width MWW (nm) in the thin film magnetic heads of Example 1 and Comparative Example 1 to be described later, respectively.

Comparative Example 1

The thin film magnetic head shown in FIG. 8 was produced, and as similar to Example 1, the overwrite value OW and a bit error rate (BER) of each thin film magnetic head were measured. Then, the writing characteristics were evaluated from those measurement results.

Results are shown in FIG. 11 and FIG. 12.

As shown in FIG. 11 and FIG. 12, in the thin film magnetic head 1 in Example 1, it was confirmed that both overwrite characteristics and BER were improved compared to the thin film magnetic head in Comparative Example 1 and it excels in the writing characteristics. It is believed that this means that saturation of a magnetic flux at the trailing shield 23, which can be generated due to leakage of the magnetic flux from the main magnetic pole layer 21, is effectively suppressed.

The invention claimed is:

1. A thin film magnetic head, comprising:
a main magnetic pole layer, and
a trailing shield positioned closer to a trailing side than the main magnetic pole layer,
wherein
the trailing shield comprises a first trailing shield that is close to the main magnetic pole layer, and a second trailing shield that is positioned to be closer to the trailing side than the first trailing shield and that continues to the first trailing shield;
the second trailing shield comprises a first end surface that is connected to a trailing-side end surface of the first trailing shield, and a second end surface that continues to an end side positioned at a back side in a height direction out of the end sides configuring the first end surface;
the second end surface comprises a first end side positioned closest to a medium opposing surface, and a second end side positioned at the farthest back side in the height direction, and closer to the trailing side than the first end side;
an angle formed by a virtual plane including the first end side and the second end side relative to a plane parallel to both the height direction and the track width direction is 30 degrees to 60 degrees, and
the first trailing shield comprises a first end surface forming a portion of the medium opposing surface, and a second end surface that is parallel to the first end surface, and that is positioned at the back side in the height direction.

2. The thin film magnetic head according to claim 1, wherein
the first trailing shield comprises a tilted end surface that faces the main magnetic layer, and that tilts so as to be closer to the trailing side as oriented toward the back side in the height direction from the medium opposing surface; and a maximum dimension between the trailing side end surface of the first trailing shield and the tilted end surface is 300 nm.

3. The thin film magnetic head according to claim 1, wherein a height-direction dimension of the first end surface of the second trailing shield is the same as that of the trailing-side end surface of the first trailing shield, or is greater than that of the trailing-side end surface of the first trailing shield within the range of 100 nm or less.

4. A head gimbal assembly including the thin film magnetic head according to claim 1, comprising:

a slider arranged so as to face a magnetic recording medium, and a suspension that elastically supports the slider.

5. A magnetic recording device including the thin film magnetic head according to claim 1, comprising:

a slider that is arranged so as to face a magnetic recording medium, and a positioning device that supports the slider and positions the slider relative to the magnetic recording medium.

6. A thin film magnetic head, comprising:

a main magnetic pole layer, and a trailing shield positioned closer to a trailing side than the main magnetic pole layer, wherein the trailing shield comprises a first trailing shield that is close to the main magnetic pole layer, and a second trailing shield that is positioned to be closer to the trailing side than the first trailing shield and that continues to the first trailing shield, the second trailing shield comprises a first end surface that is connected to a trailing-side end surface of the first trailing shield, and a second end surface that continues to an end side positioned at a back side in a height direction out of the end sides configuring the first end surface, the second end surface comprises a first end side positioned closest to a medium opposing surface, and a second end side positioned at the farthest back side in the height direction, and closer to the trailing side than the first end side, an angle formed by a virtual plane including the first end side and the second end side relative to a plane parallel to both the height direction and the track width direction is 30 degrees to 60 degrees, the first trailing shield comprises a first end surface configuring a portion of the medium opposing surface, and a second end surface that faces the first end surface, and that is positioned at the back side in the height direction, and the length between the first end surface and the second end surface in a perpendicular direction to the medium opposing surface is 300 nm or less.

7. The thin film magnetic head according to claim 2, wherein the first trailing shield comprises a tilted end surface that faces the main magnetic layer, and that tilts so as to be closer to the trailing side as oriented toward the back side in the height direction from the medium opposing surface; and a maximum dimension between the trailing side end surface of the first trailing shield and the tilted end surface is 300 nm.

8. The thin film magnetic head according to claim 2, wherein a height-direction dimension of the first end surface of the second trailing shield is the same as that of the trailing-side end surface of the first trailing shield, or is greater than that of the trailing-side end surface of the first trailing shield within the range of 100 nm or less.

9. A head gimbal assembly including the thin film magnetic head according to claim 2, comprising:

a slider arranged so as to face a magnetic recording medium, and a suspension that elastically supports the slider.

10. A magnetic recording device including the thin film magnetic head according to claim 2, comprising:

a slider that is arranged so as to face a magnetic recording medium, and a positioning device that supports the slider and positions the slider relative to the magnetic recording medium.

* * * * *